Figure 1:
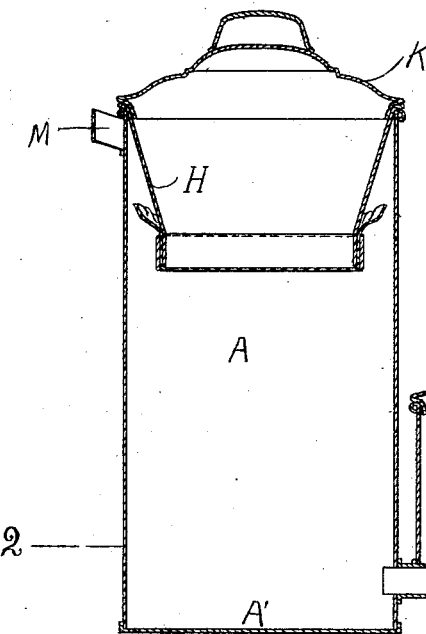
Figure 1:
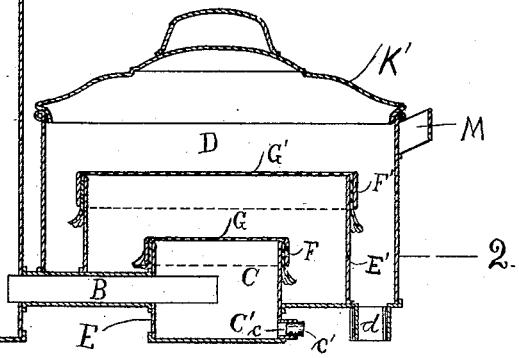

(No Model.)

C. C. DALY.
MILK STRAINER.

No. 452,264. Patented May 12, 1891.

WITNESSES.
O. Ramel
Jos. W. Crookes

INVENTOR.
Charles C. Daly by
Paul Bakewell
his attorney

UNITED STATES PATENT OFFICE.

CHARLES C. DALY, OF DELHI, ILLINOIS.

MILK-STRAINER.

SPECIFICATION forming part of Letters Patent No. 452,264, dated May 12, 1891.

Application filed October 4, 1890. Serial No. 367,064. (No model.)

*To all whom it may concern:*

Be it known that I, CHARLES C. DALY, a citizen of the United States, residing at Delhi, in the county of Jersey and State of Illinois, have invented certain new and useful Improvements in Milk-Strainers, of which the following is a full, clear, and exact description.

My invention relates to means and devices for straining milk to free it from the insoluble earthy and animal matters carried and held in suspension by the milk, and which appear as sediment in the bottom of a vessel in which milk has been standing for any length of time.

Heretofore the milk has been strained by pouring it into a vessel through a strainer, which in practice has been found, preferably, to make out of open meshed cloth, popularly known as "cheese-cloth," by securing the cloth over the opening through which the milk is poured. By this method it has been found in practice that more or less of the objectionable matter intended to be strained out of the milk is carried through the strainer with it, no matter how fine the meshes of the strainer are or how many thicknesses of cloth are used in the same. The principal cause of this undoubtedly lies in the fact that the continued pouring of the milk onto and through the strainer will tend, and does, in fact, disintegrate the particles of matter strained out of the milk and supported on the strainer in the first instance until it is fine enough to be carried through the meshes of the strainer.

The object of my invention is to provide means for straining the milk by which it is thoroughly freed from all the objectionable foreign matter, no matter in how fine particles it may appear. I accomplish this by straining the milk by an upward flow of the same through the strainer, whereby the particles of matter held back from the milk in passing through will tend to drop away from the surface of the strainer to a position or place where it will be acted on by the continued flow of the milk, as in the old method.

My invention consists, essentially, in a vessel into which the milk is poured, acting as a stand-pipe, connected at its lower end by a conduit pipe or passage with the corresponding part of another vessel, the ingress to the containing parts of such second vessel being through openings or passages protected by strainers, and the flow of the milk through such strainers being in an upward direction, caused by the milk, as a liquid, seeking its level, that of the milk in the first vessel.

The accompanying drawings, in which like letters of reference denote like parts in the several figures, serve to illustrate my improved strainer.

Figure 2:
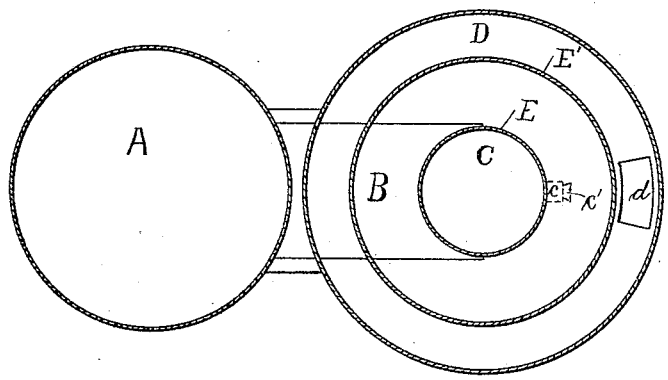

Figure 1 is a vertical section taken centrally through the two parts hereinafter described of my contrivance, and Fig. 2 is a horizontal section taken on the line 2 2 in Fig. 1.

My improved strainer is constructed substantially as follows: I connect the lower portion of a conveniently-sized vessel A at a point preferably somewhat above the bottom thereof, in order to leave a settling-basin A' in the bottom of the vessel below the point of egress by a conduit pipe or passage B to the central interior portion C of a vessel D. This interior portion C is formed by the circular partition-wall E, which extends downwardly from a convenient height above the bottom of the vessel D to a short distance below the same, forming a settling-basin C' below the level of the conduit-pipe B, and more or less below the disturbing influence of the current of the milk as coming through the pipe B. This basin or false bottom C' is provided with an outlet c, closed by any convenient means, such as a plug or a faucet c', whereby the milk in the same may be withdrawn therefrom. The wall E is sealed to the bottom of the vessel D, so as to be water-tight. The top of the wall E is formed so as to receive the clamping-ring F, which is used to secure the strainer-cloth G, placed across the top of this interior portion C. There is, preferably, another interior wall E', placed around the first wall E, similar thereto but extending from the bottom of the vessel D to somewhat above the level of the top of the partition-wall E, and provided, like E, with a clamping-ring F' to secure the strainer-cloth G'. In this way the process of upward straining, as through the strainer-cloth G from the interior portion C, is duplicated in being compelled to pass through the second strainer-cloth G' before it gets into the interior proper of the vessel D. The milk is withdrawn from the vessel D by an outlet-opening d, formed at any convenient point, preferably in the bottom, being provided therefor, as shown in the drawings. The milk is preferably passed through an ordinary strainer H, secured to the top of the vessel A in pouring it into the same. The two vessels are provided with covers K and K' and handles M to conveniently handle the contrivance as a whole.

In using the strainer the milk is poured into the vessel A through the strainer H, which rids it of the larger particles of foreign matter. From thence it flows through the conduit B over into the vessel C. As soon as enough milk has been poured into the vessel A to bring the level of the liquid therein above the top of the partition-wall E, forming the interior of the vessel C, it will be forced by gravity, in the milk seeking its level in the two vessels, upwardly through the strainer-cloth G. As the pouring is continued, the level of the milk in the second vessel D will get above the secondary partition-wall E', and will be forced up through the second strainer-cloth G' out into the vessel D proper, from which it can be withdrawn into some convenient receiving-vessel (not shown) through the outlet d. As will be evident, if the secondary partition-wall E' is dispensed with, which in practice may be found desirable, the milk in the operation of the strainer will overflow the partition-wall E directly into the vessel D proper, from which, in that instance, all the strained milk can be withdrawn therefrom through the outlet d; and, further, the height of the partition-wall E need not be greater than to accommodate the strainer-cloth G and clamping-ring F, so that practically all the milk poured into the vessel A will be strained over into the vessel D. The plug c' can be withdrawn from time to time, permitting a flow of milk therefrom, which will tend to wash out any sediment or deposit that may have accumulated there.

The portion A' of the vessel A below the level of the conduit B, while not essential, may in practice be found of advantage as a settling-basin, in which the milk is comparatively quiet and free from the disturbing influence of the flow of the milk through the conduit-pipe B.

The special form and construction of my improved strainer permits of the same being taken apart and the operative parts, especially the strainers, thoroughly cleaned—an essential desideratum of practical importance in apparatus of this character.

I claim—

1. In a milk-strainer, two vessels connected at or near their bottoms by a conduit-pipe, the opening of said conduit-pipe in one of said vessels being surrounded by a partition-wall hermetically sealed to the bottom of said vessel and extending upwardly a convenient distance, the top of said partition-wall being formed to receive and have secured thereto a strainer, and an outlet-opening formed in the bottom of said vessel exterior to said partition-wall, combined and operating substantially as described.

2. In a milk-strainer, vessel A, conduit-pipe B, vessel D, formed with a partition-wall E, strainer G, secondary partition-wall E', strainer G', and outlet d, combined and operating substantially as described, and for the purposes specified.

3. In a milk-strainer, the vessel A, into the top of which is fitted the strainer H, the conduit-pipe B, the secondary vessel D, the interior portion C, strainer G, and outlet-opening d, in combination with the settling-basins A' and C', substantially as and for the purposes specified.

In testimony whereof I affix my signature, in presence of two witnesses, this 22d day of September, 1890.

CHARLES C. DALY.

Witnesses:
JOS. W. CROOKES,
A. RAMES.